United States Patent
Chen

(10) Patent No.: US 9,586,462 B2
(45) Date of Patent: Mar. 7, 2017

(54) REINFORCEMENT BRACKET FOR A TRUNK HANDLE

(71) Applicant: Wen Chen, Parkland, FL (US)

(72) Inventor: Wen Chen, Parkland, FL (US)

( * ) Notice: Subject to any disclaimer, the term of this patent is extended or adjusted under 35 U.S.C. 154(b) by 204 days.

(21) Appl. No.: 14/522,346

(22) Filed: Oct. 23, 2014

(65) Prior Publication Data

US 2015/0115116 A1   Apr. 30, 2015

Related U.S. Application Data

(60) Provisional application No. 61/895,714, filed on Oct. 25, 2013.

(51) Int. Cl.
*B60J 5/00* (2006.01)
*B60J 5/10* (2006.01)

(52) U.S. Cl.
CPC ...................... *B60J 5/107* (2013.01)

(58) Field of Classification Search
CPC ........ B60J 5/107; B60J 5/0416; B60J 5/0463; B60J 5/10; E05B 79/04
See application file for complete search history.

(56) References Cited

U.S. PATENT DOCUMENTS

| | | | | |
|---|---|---|---|---|
| 5,906,073 A * | 5/1999 | Hori | ........................ | B60J 5/107 49/394 |
| 5,987,943 A * | 11/1999 | Verga | ..................... | E05B 83/16 292/DIG. 31 |
| 6,019,418 A * | 2/2000 | Emerling | ............... | B60J 5/0416 296/146.7 |
| 6,908,142 B2 * | 6/2005 | Gougeon | ................... | B60J 5/10 296/146.1 |
| 7,661,743 B2 * | 2/2010 | Williamson | ............ | E05B 79/06 296/146.1 |
| 8,152,220 B2 * | 4/2012 | Fukui | ....................... | B60J 5/101 16/110.1 |
| 8,469,412 B2 * | 6/2013 | Mizushima | ............. | E05B 85/18 292/336.3 |
| 8,979,161 B2 * | 3/2015 | Patterson | ................. | B60J 5/107 296/50 |
| 2015/0329066 A1 * | 11/2015 | Barrow | .................... | B60J 5/107 296/56 |

\* cited by examiner

*Primary Examiner* — Bradley Duckworth

(57) ABSTRACT

The reinforcement bracket provides structural integrity for the trunk handle of an automobile, in particular the Scion tC. The bracket includes first fastening interface, a second fastening interface, a handle support structure, a first planar brace, a second planar brace, and a web. The handle support structure includes a planar body and a grasping hole. The grasping hole traverses through the planar body to facilitate the placement of the lock actuator. The first planar brace and second planar brace are oriented parallel and offset to each other as well as being positioned adjacent and normal to the planar body. The web is connected between the two planar braces and provides additional structural rigidity. The bracket is attached to the trunk handle and trunk through the two fastening interfaces. The first and second fastening interface is connected adjacent and normal to the first and second planar brace, respectively.

14 Claims, 5 Drawing Sheets

Detail A

REINFORCEMENT BRACKET FOR A TRUNK HANDLE

The current application claims a priority to the U.S. Provisional Patent application Ser. No. 61/895,714 filed on Oct. 25, 2013.

FIELD OF THE INVENTION

The present invention relates generally to the field of automotive accessories. More specifically, the present invention is a reinforcement bracket for the handle portion of the hatch trunk of the Scion tC.

BACKGROUND OF THE INVENTION

In 2005, Toyota Motor Corporation released the updated version of their popular Scion tC hatchback with a design flaw. The model and the subsequent six versions of the vehicle all have a rear hatch, handle design flaw that is prone to failure as a result of regular use and extreme weather conditions. The problem lies in the fastening mechanism used to attach the handle to the trunk; the handle is attached to the hatch trunk through a plurality of plastic screws distributed about the length of the component. Everyday use applied excessive pressure and stress is applied to the plastic screws and in many cases this leads to structural failure; the plastic screws simply snap under the pressure making the handle and thus the trunk inoperable and inaccessible. Furthermore, these clips are known for snapping under extreme cold weather conditions as well.

The company is aware of this issue but will not initiate a recall for the part because it is claimed to be a garnish and its malfunction does not pose any safety hazards. Contrary to the companies' statement, the handle is not a garnish and does pose potential safety hazard to vehicle occupants. A garnish is, by definition is a decoration of some sorts with no utility what so ever; the handle component of the vehicle is clearly designed to be more than an aesthetic feature, it provides the user a means for opening the trunk. Two of the main risks accompanying a broken handle are unwanted fumes entering the interior of the vehicle and the inability to open the trunk from the interior; this is especially problematic in vehicular accidents when an occupant is trapped inside the car with the side doors pinned, locked, or broken and the rear trunk is the only means of escape from the vehicle.

When the handle does break off, the only available solution is to buy another handle and have it installed; this costs hundreds of dollars and replaces the broken handle with an equally faulty part. The present invention permanently solves the problem by providing structural reinforcement to the handle and ensuring the plastic screws do not break in the future.

DETAIL DESCRIPTIONS OF THE INVENTION

Figure 1:
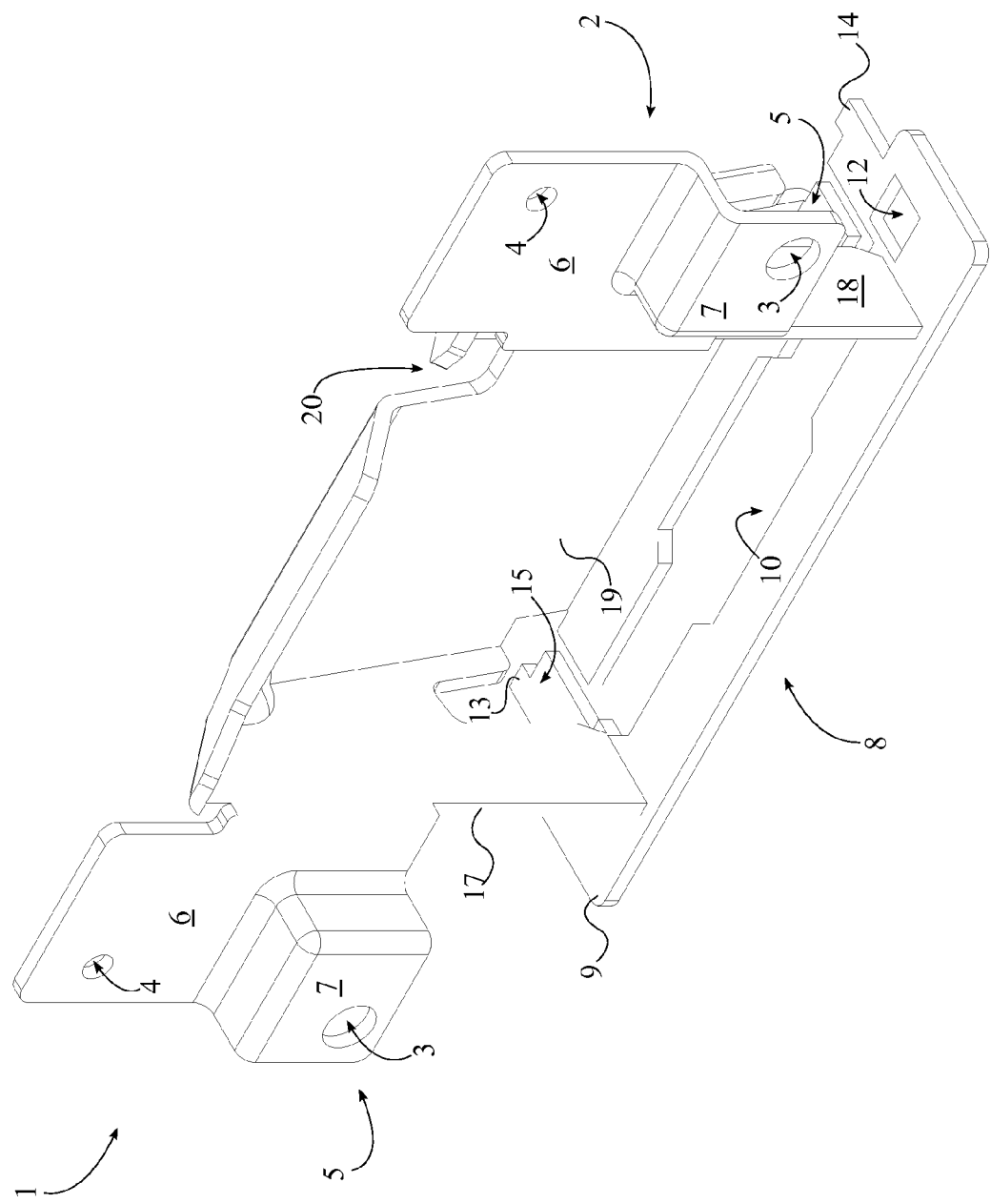
FIG. 1 is a perspective view of the present invention.

All illustrations of the drawings are for the purpose of describing selected versions of the present invention and are not intended to limit the scope of the present invention.

As seen in FIG. 1-FIG. 4, the present invention is a reinforcement bracket for a trunk handle of an automobile, in particular a Scion tC hatchback. The present invention provides the necessary structural integrity to the trunk handle and thus prevents future structural failures which the faulty handle is commonly known for. The present invention comprises a first fastening interface 1, a second fastening interface 2, a handle support structure 8, a first planar brace 17, a second planar brace 18, and a web 19. The first fastening interface 1 and the second fastening interface 2 facilitate the attachment of the present invention to the handle and to the trunk. The handle support structure 8 adds structural rigidity to the user engagement area of the handle. The first planar brace 17 and the second planar brace 18 work in conjunction with the handle support structure 8 to redirect the majority of the forces caused through the user pulling on the handle to the first fastening interface 1 and the second fastening interface 2. The web 19 connects the first planar brace 17 to the second planar brace 18 and as a result increases the structural integrity of the bracket. Additionally, the web 19 facilitates the transfer of forces from the handle support structure 8 to the fastening means. The preferred material composition for the present invention is steel or stainless steel. Alternative material composition may be utilized as well including, but not limited to, stainless steel, platinum, aluminum, carbon fiber, plastic, and other similar materials.

Figure 2:
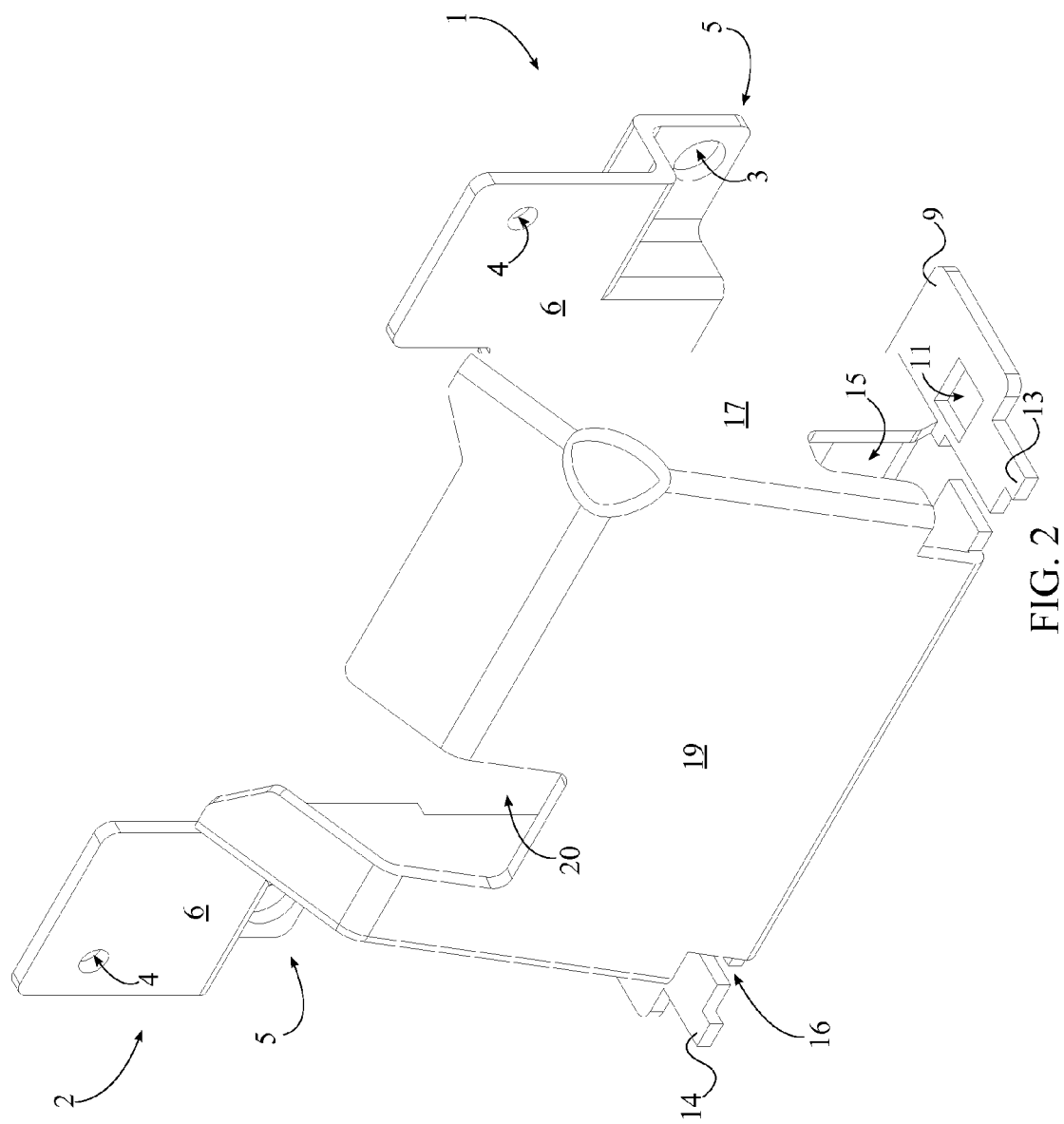
FIG. 2 is a rear perspective view of the present invention.

The handle support structure 8 comprises a planar body 9 and a grasping hole 10 as seen in FIG. 1. The grasping hole 10 traverses normal and through the planar body 9 in between the first planar brace 17 and the second planar brace 18. In the preferred embodiment, the grasping hole 10 is shaped and sized complimentary to the finger engagement region of the trunk handle. The first planar brace 17 and the second planar brace 18 are connected adjacent and perpendicular to the planar body 9. The first planar brace 17 and the second planar brace 18 are oriented parallel and offset to each other, positioning the grasping hole 10 in the middle as seen in FIG. 1. For increased structural integrity, the web 19 is adjacently connected in between the first planar brace 17 and the second planar brace 18. In the preferred embodiment, the web 19 is single slab of material bent at an angle to conform to the interior design of the trunk. This ensures a proper fit without modification and or alteration to the original trunk handle design. The first fastening interface 1 is connected adjacent and perpendicular to the first planar brace 17, opposite the web 19. In a similar fashion, the second fastening interface 2 is connected adjacent and perpendicular to the second planar brace 18, opposite the web 19. Additionally, the first fastening interface 1 and the second fastening interface 2 are positioned perpendicular to the planar body 9 as seen in FIG. 1 and FIG. 2. The first fastening interface 1 and the second fastening interface 2 secure the present invention to the trunk handle and the trunk therefore altering the engagement junction between the handle and the trunk such that stresses and forces from everyday's use are redistributed about the present invention and not through the original faulty clips.

Figure 5:
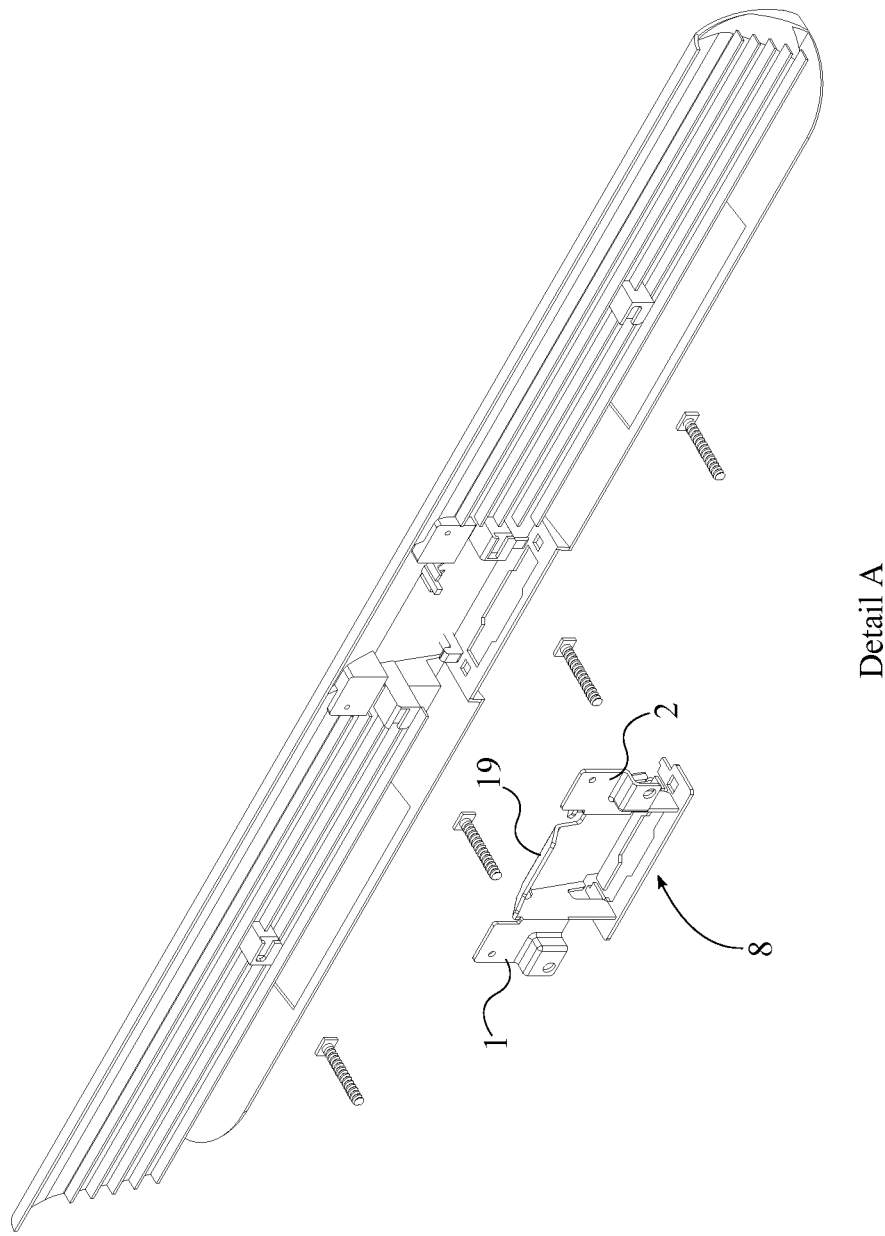
FIG. 5 is a magnified view of the Detail A as depicted in FIG. 4.

In the preferred embodiment, the first fastening interface 1 and the second fastening interface 2 each comprise a large fastener-receiving hole 3, a small fastener-receiving hole 4, a corner-bracing portion 5, and a flat portion 6. The corner-bracing portion 5 facilitates the attachment of the present invention to the trunk while the flat portion 6 is used to attach the present invention to the trunk handle. The corner-bracing portion 5 contains a base 7 that is positioned parallel to the flat portion 6 and shaped complimentary to the interior surface of the trunk handle. The large fastener-receiving hole 3 traverses normal and through the base 7 to allow a bolt or screw to attach the present invention to the trunk as seen in FIG. 5. The small fastener-receiving hole 4 traverses normal and through the flat portion 6 to allow a bolt or screw to attach the present invention to the trunk handle. Additionally, the large fastener-receiving hole 3 and the small fastener-receiving hole 4 of the first fastening interface 1 are offset from each other across the first fastening interface 1 to increase the strength of the junction between the trunk handle and the trunk. Similarly, the large fastener-receiving hole 3 and the small fastener-receiving hole 4 of the second fastening interface 2 are offset from each other across the second fastening interface 2. Alternative fastening means may also be utilized for securing the present invention the trunk and/or trunk handle including, but not limited to welding, adhesive, mechanical locking mechanisms, and other similar means.

Figure 3:
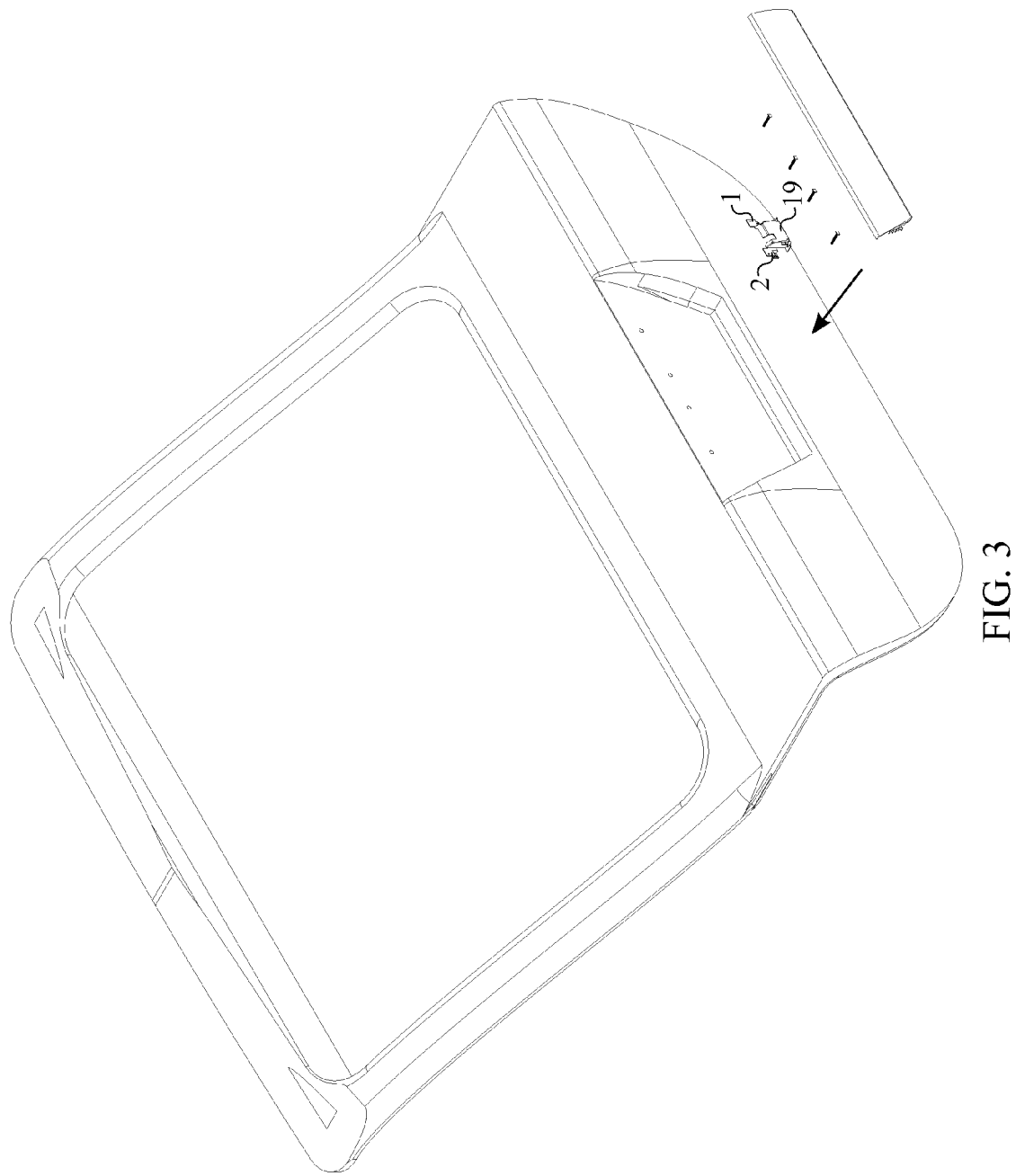
FIG. 3 is a side perspective exploded view of the present invention mounted onto a trunk handle and trunk.
Figure 4:
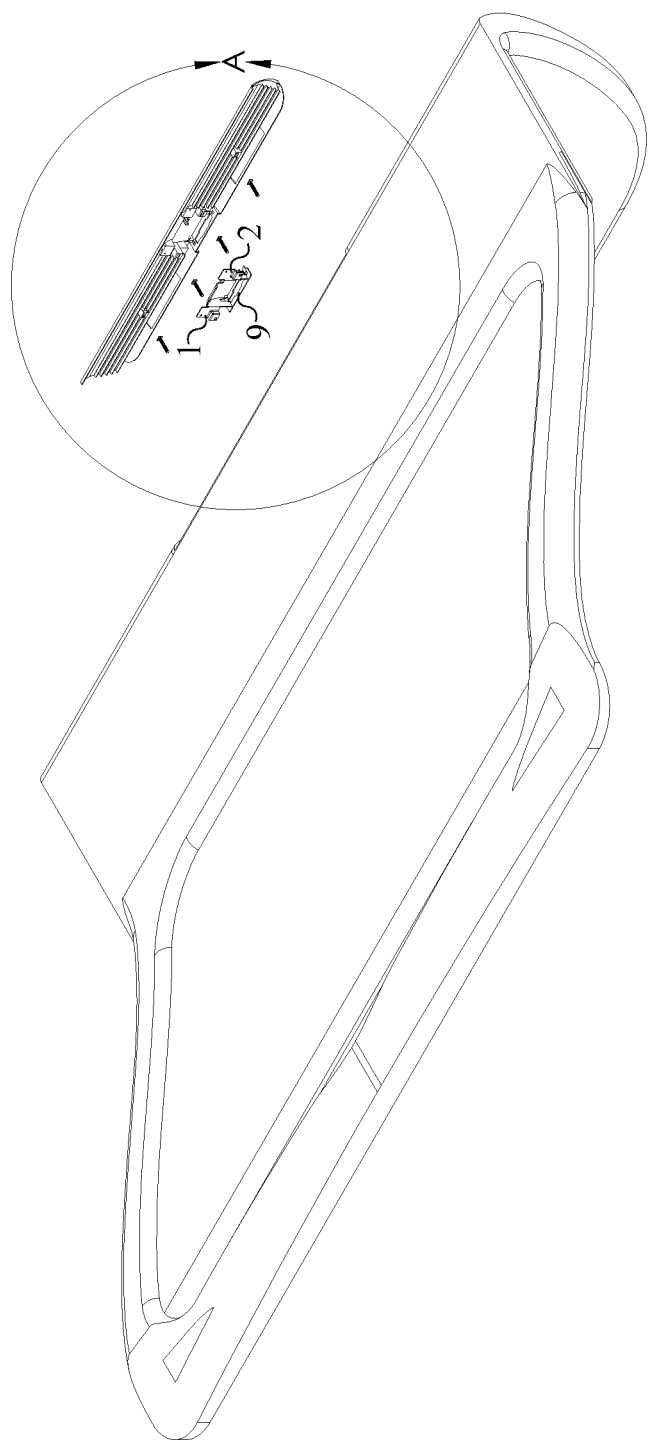
FIG. 4 is a front perspective exploded view of the present invention mounted onto a trunk handle and trunk.

In the preferred embodiment, the present invention is installed onto the trunk handle of a Scion tC as seen in FIG. 3 and FIG. 4, as a result contains a plurality of features which facilitate the installation and fitting process. Included among the features is a rib-receiving notch 20; the rib-receiving notch 20 traverses through the web 19, opposite the handle support structure 8 as seen in FIG. 2. The rib-receiving notch 20 is positioned complimentary to the structural ribs located on the inner surface of the trunk handle such that the structural ribs do not interfere with the placement of the present invention in the trunk handle as seen in FIG. 5.

Furthermore, the handle support structure 8 further comprises a first installation hole 11, a second installation hole 12, a first tab 13, a second tab 14, a first junction of rib-receiving cuts 15, and a second junction of rib-receiving cuts 16. The first installation hole 11 and the second installation hole 12 traverse normal and through the planar body 9 to yield a through hole for the placement of plastic screw insert that is used to secure the handle's electronic switch. The handle's electronic switch spans the width of the handle support structure 8 and thus the plastic screw inserts are located on either end of the component; the first installation hole 11 and the second installation hole 12 are positioned adjacent to the first planar brace 17 and the second planar brace 18, respectively. The first installation hole 11 and the second installation hole 12 are shaped complimentary to the plastic screw inserts; in the case of the Scion tC automobile, the shape is square in nature as seen in FIG. 1. The first tab 13 and second tab 14 anchor the present invention to the trunk handle and prevent the bracket from translating side to side and below a certain point. The first tab 13 and the second tab 14 are laterally connected to the planar body 9, offset from each other a certain distance. The first tab 13 and second tab 14 are also positioned adjacent to the web 19 to directly engage the inner surface of the truck handle.

The first junction of rib-receiving cuts 15 and the second junction of rib-receiving cuts 16 create slots and holes in the present invention which are complimentary to the design of the trunk handle and facilitate the installation process. The first junction of rib-receiving cuts 15 is integrated into the intersection between the first planar brace 17, the web 19, and the planar body 9; essentially the left side of the present invention when viewed from the front perspective. In a similar fashion, the second junction of rib-receiving cuts 16 is integrated into the intersection between the second planar brace 18, the web 19, and the planar body 9. The trunk handle contains two lateral rib extrusions to which the first junction of rib-receiving cuts 15 and second junction of rib-receiving cuts 16 are designed for; during the installation process the present invention is positioned with the cuts adjacent to the lateral rib extrusions such that the present invention slides onto the lateral rib extrusions and sits firmly on them, making the fastening process much easier for the user.

Although the invention has been explained in relation to its preferred embodiment, it is to be understood that many other possible modifications and variations can be made without departing from the spirit and scope of the invention as hereinafter claimed.

What is claimed is:

1. A reinforcement bracket for a trunk handle comprising:
    a first fastening interface;
    a second fastening interface;
    a handle support structure;
    a first planar brace;
    a second planar brace;
    a web;
    the handle support structure comprising a planar body and a grasping hole;
    the first planar brace and the second planar brace being connected adjacent and perpendicular to the planar body;
    the first planar brace and the second planar brace being oriented parallel and offset to each other;
    the web being adjacently connected in between the first planar brace and the second planar brace;
    the grasping hole traversing normal and through the planar body in between the first planar brace and the second planar brace;
    the first fastening interface being connected adjacent and perpendicular to the first planar brace, opposite to the web;
    the second fastening interface being connected adjacent and perpendicular to the second planar brace, opposite to the web;
    the first fastening interface and the second fastening interface being positioned perpendicular to the planar body;
    the handle support structure further comprising a first installation hole and a second installation hole;
    the first installation hole and the second installation hole traversing normal and through the planar body;
    the first installation hole being positioned adjacent to the first planar brace, opposite to the grasping hole; and
    the second installation hole being positioned adjacent to the second planar brace, opposite to the grasping hole.

2. The reinforcement bracket for a trunk handle as claimed in claim 1 comprises:
    a rib-receiving notch; and
    the rib-receiving notch traversing into the web, opposite the handle support structure.

3. The reinforcement bracket for a trunk handle as claimed in claim 1 comprises:
    the handle support structure further comprises a first tab and a second tab;
    the first tab and the second tab being offset from each other;
    the first tab and the second tab being laterally connected to the planar body; and the first tab and the second tab being positioned adjacent to the web.

4. The reinforcement bracket for a trunk handle as claimed in claim 1 comprises:
the handle support structure further comprises a first junction of rib-receiving cuts and a second junction of rib-receiving cuts;
the first junction of rib-receiving cuts being integrated into the intersection between the first planar brace, the web, and the planar body; and
the second junction of rib-receiving cuts being integrated into the intersection between the second planar brace, the web, and the planar body.

5. The reinforcement bracket for a trunk handle as claimed in claim 1 comprises:
the first fastening interface and the second fastening interface each comprise a large fastener-receiving hole, a small fastener-receiving hole, a corner-bracing portion, and a flat portion;
a base of the corner-bracing portion being positioned parallel to the flat portion;
the large fastener-receiving hole traversing normal and through the base of the corner-bracing portion;
the small fastener-receiving hole traversing normal and through the flat portion;
the large fastener-receiving hole and the small fastener-receiving hole of the first fastening interface being offset from each other across the first fastening interface; and
the large fastener-receiving hole and the small fastener-receiving hole of the second fastening interface being offset from each other across the second fastening interface.

6. A reinforcement bracket for a trunk handle comprises:
a first fastening interface;
a second fastening interface;
a handle support structure;
a first planar brace;
a second planar brace;
a web;
the handle support structure comprises a planar body and a grasping hole;
the first planar brace and the second planar brace being connected adjacent and perpendicular to the planar body;
the first planar brace and the second planar brace being oriented parallel and offset to each other;
the web being adjacently connected in between the first planar brace and the second planar brace;
the grasping hole traversing normal and through the planar body in between the first planar brace and the second planar brace;
the first fastening interface being connected adjacent and perpendicular to the first planar brace, opposite to the web;
the second fastening interface being connected adjacent and perpendicular to the second planar brace, opposite to the web;
the first fastening interface and the second fastening interface being positioned perpendicular to the planar body;
the first fastening interface and the second fastening interface each comprise a large fastener-receiving hole, a small fastener-receiving hole, a corner-bracing portion, and a flat portion;
a base of the corner-bracing portion being positioned parallel to the flat portion;
the large fastener-receiving hole traversing normal and through the base of the corner-bracing portion;
the small fastener-receiving hole traversing normal and through the flat portion;
the large fastener-receiving hole and the small fastener-receiving hole of the first fastening interface being offset from each other across the first fastening interface; and
the large fastener-receiving hole and the small fastener-receiving hole of the second fastening interface being offset from each other across the second fastening interface.

7. The reinforcement bracket for a trunk handle as claimed in claim 6 comprises:
a rib-receiving notch; and
the rib-receiving notch traversing into the web, opposite the handle support structure.

8. The reinforcement bracket for a trunk handle as claimed in claim 6 comprises:
the handle support structure further comprises a first installation hole and a second installation hole;
the first installation hole and the second installation hole traversing normal and through the planar body;
the first installation hole being positioned adjacent to the first planar brace, opposite to the grasping hole; and
the second installation hole being positioned adjacent to the second planar brace, opposite to the grasping hole.

9. The reinforcement bracket for a trunk handle as claimed in claim 6 comprises:
the handle support structure further comprises a first tab and a second tab;
the first tab and the second tab being offset from each other;
the first tab and the second tab being laterally connected to the planar body; and
the first tab and the second tab being positioned adjacent to the web.

10. The reinforcement bracket for a trunk handle as claimed in claim 6 comprises:
the handle support structure further comprises a first junction of rib-receiving cuts and a second junction of rib-receiving cuts;
the first junction of rib-receiving cuts being integrated into the intersection between the first planar brace, the web, and the planar body; and
the second junction of rib-receiving cuts being integrated into the intersection between the second planar brace, the web, and the planar body.

11. A reinforcement bracket for a trunk handle comprising:
a first fastening interface;
a second fastening interface;
a handle support structure;
a first planar brace;
a second planar brace;
a web;
the handle support structure comprising a planar body, a grasping hole, a first installation hole and a second installation hole;
the first planar brace and the second planar brace being connected adjacent and perpendicular to the planar body;
the first planar brace and the second planar brace being oriented parallel and offset to each other;
the first installation hole and the second installation hole traversing normal and through the planar body;

the first installation hole being positioned adjacent to the first planar brace, opposite to the grasping hole;

the second installation hole being positioned adjacent to the second planar brace, opposite to the grasping hole;

the web being adjacently connected in between the first planar brace and the second planar brace;

the grasping hole traversing normal and through the planar body in between the first planar brace and the second planar brace;

the first fastening interface being connected adjacent and perpendicular to the first planar brace, opposite to the web;

the second fastening interface being connected adjacent and perpendicular to the second planar brace, opposite to the web;

the first fastening interface and the second fastening interface being positioned perpendicular to the planar body;

the first fastening interface and the second fastening interface each comprising a large fastener-receiving hole, a small fastener-receiving hole, a corner-bracing portion, and a flat portion;

a base of the corner-bracing portion being positioned parallel to the flat portion;

the large fastener-receiving hole traversing normal and through the base of the corner-bracing portion;

the small fastener-receiving hole traversing normal and through the flat portion;

the large fastener-receiving hole and the small fastener-receiving hole of the first fastening interface being offset from each other across the first fastening interface; and the large fastener-receiving hole and the small fastener-receiving hole of the second fastening interface being offset from each other across the second fastening interface.

12. The reinforcement bracket for a trunk handle as claimed in claim 11 comprises:

a rib-receiving notch; and the rib-receiving notch traversing into the web, opposite the handle support structure.

13. The reinforcement bracket for a trunk handle as claimed in claim 11 comprises:

the handle support structure further comprises a first tab and a second tab;

the first tab and the second tab being offset from each other;

the first tab and the second tab being laterally connected to the planar body; and the first tab and the second tab being positioned adjacent to the web.

14. The reinforcement bracket for a trunk handle as claimed in claim 11 comprises:

the handle support structure further comprises a first junction of rib-receiving cuts and a second junction of rib-receiving cuts;

the first junction of rib-receiving cuts being integrated into the intersection between the first planar brace, the web, and the planar body; and the second junction of rib-receiving cuts being integrated into the intersection between the second planar brace, the web, and the planar body.

* * * * *